Figure 1:
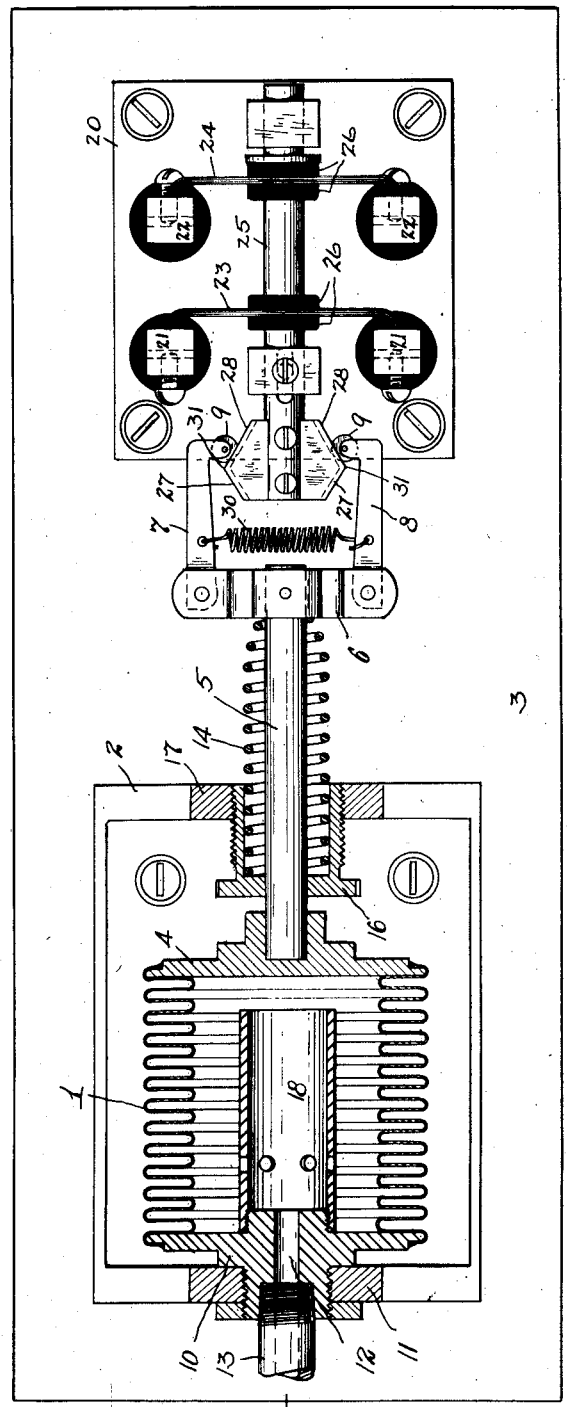

Oct. 23, 1923.

H. T. PATTON

AUTOMATIC CONTROL MECHANISM FOR ELECTRIC SWITCHES

Filed Aug. 25, 1920

1,471,859

2 Sheets-Sheet 1

Inventor
Hal T. Patton
By Fay, Oberlin & Fay
Attorneys

Oct. 23, 1923.
H. T. PATTON
1,471,859
AUTOMATIC CONTROL MECHANISM FOR ELECTRIC SWITCHES
Filed Aug. 25, 1920    2 Sheets-Sheet 2
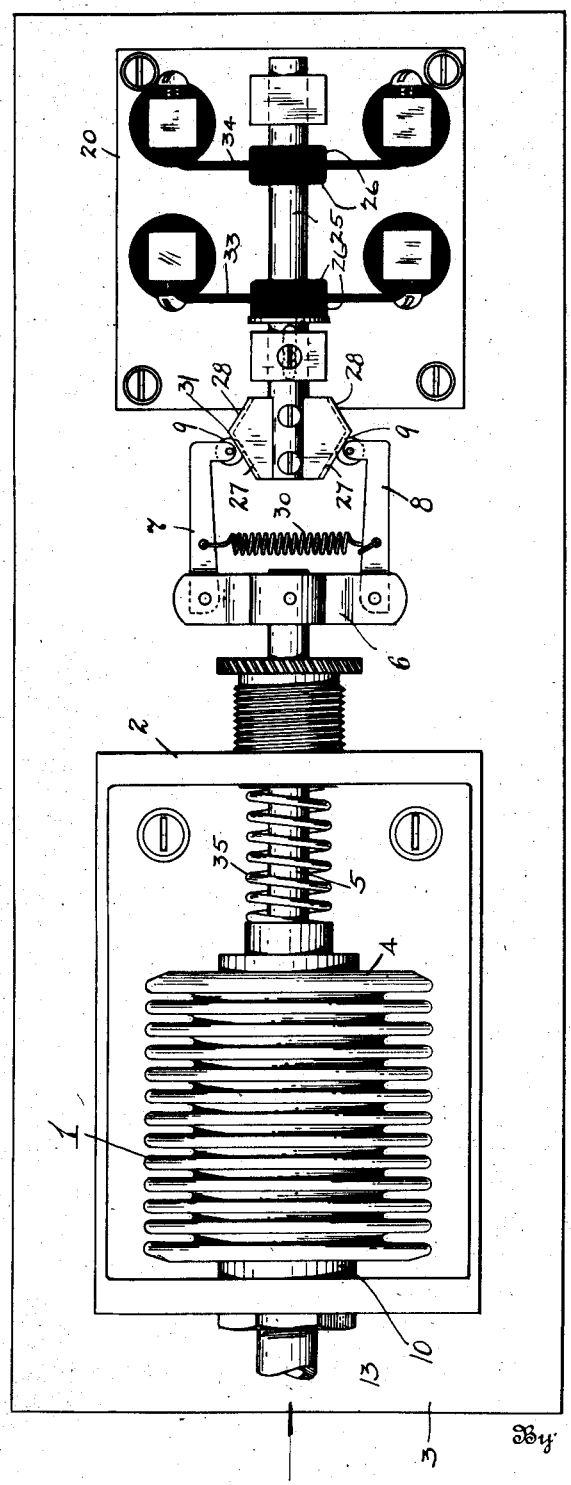
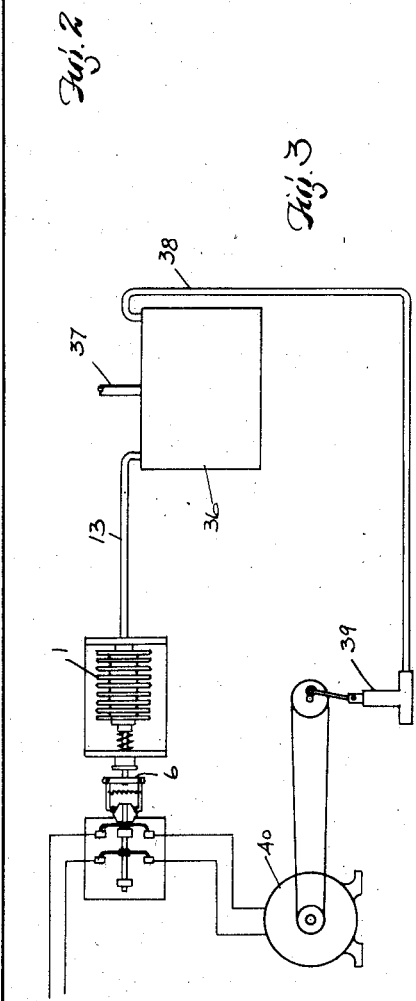
Inventor
Hal T. Patton -
By Day, Oberlin & Day
Attorneys Patented Oct. 23, 1923.

1,471,859

UNITED STATES PATENT OFFICE.

HAL T. PATTON, OF CLEVELAND, OHIO, ASSIGNOR TO BISHOP & BABCOCK COMPANY, OF CLEVELAND, OHIO, A CORPORATION OF OHIO.

AUTOMATIC CONTROL MECHANISM FOR ELECTRIC SWITCHES.

Application filed August 25, 1920. Serial No. 405,821.

*To all whom it may concern:*

Be it known that I, HAL T. PATTON, a citizen of the United States, and a resident of Cleveland, county of Cuyahoga, and State of Ohio, have invented a new and useful Improvement in Automatic Control Mechanism for Electric Switches, of which the following is a specification, the principle of the invention being herein explained and the best mode in which I have contemplated applying that principle, so as to distinguish it from other inventions.

The present invention relates to an automatic control mechanism for electric switches, and is designed for the purpose of automatically controlling the operation of a switch or other power-controlling means upon the attainment of a predetermined pressure in various apparatus. The device may be used for controlling heating systems, or the pressure on individual water systems, or for controlling refrigerating or other apparatus. To the accomplishment of the foregoing and related ends, said invention, then, consists of the means hereinafter fully described and particularly pointed out in the claims.

The annexed drawing and the following description sets forth in detail certain mechanism embodying the invention, such disclosed means constituting, however, but one of various mechanical forms in which the principle of the invention may be used.

In said annexed drawings:—

Fig. 1 is a plan view partially in section of my improved device; Fig. 2 is a similar view showing certain modifications; and Fig. 3 is a plan view of my device shown more or less diagrammatically in connection with a system to be controlled thereby.

Referring now to Fig. 1, I have shown a pressure-controlled member in the form of a flexible corrugated metal bellows 1, which is suitably mounted upon a plate 2, which is in turn carried upon a base plate or member 3. This flexible member 1 is provided with a head 4, to the closed end of which is attached a stem 5 carrying a cross member 6, on the ends of which are two substantially parallel arms 7 and 8, each of which is provided with a small roller 9. The other end of the flexible member 1 is attached to a head 10 which is engaged in an up-standing projection 11 on the base plate 2, this plate 10 being provided with an opening 12 therethrough connected with an opening in the interior of the tube 13 which is fastened to the plate 10. The tube 13 may be connected with the tank or other reservoir in which a given pressure is maintained, and in this way the pressure existing in the tank or reservoir will be maintained in the flexible member 1, and an increase in pressure will cause expansion of this member, while a decrease in pressure will allow for contraction.

As constructed in Fig. 1, the device is intended to operate on subnormal pressures, and to maintain a given degree of vacuum in the reservoir, to which the pipe 13 leads. In order to maintain the bellows member in an extended position upon the normal degree of vacuum a coiled spring 14 is provided between the cross members 6 and a cap 16 encircling the stem 5 and mounted in a projection 17 on the base plate 2. Also an open-ended tube 18 is attached to the plate 10 and extends longitudinally through the bellows 1 to prevent collapsing of the bellows or give the metal walls a permanent set. The head 4 of the bellows will engage against the outer or open end of this tube 18 before injury to the bellows can occur.

The switch mechanism consists of a base plate 20 attached to the board 3, upon which are mounted binding posts 21 and 22 which are adapted to be engaged and electrically connected by means of switches consisting of a series of resilient plates 23 and 24. Each set of plates are connected together and mounted upon a longitudinally movable rod or switch member 25 by means of insulating blocks 26. In the position shown in Fig. 1, when the switches are closed the two binding posts 21 are electrically connected, as are the two binding posts 22, and it will be understood that any desired number of switch members and binding posts may be used, depending upon whether a two-pole or three-pole or other switch is desired.

The rod 25 of the switch member is provided with two sets of bevel engaging faces 27 and 28, which are inclined in opposite directions and adjoin each other. The rollers 9 on the arms 7 and 8 are pressed against such engaging surfaces by means of a spring 30 connecting these two arms.

In operation the normal position of the device is indicated in Fig. 1 for the control of the vacuum system, and, as shown, the switches are closed and are held in such closed position by means of the pressure of the rollers 9 against the beveled surfaces 28 on the rod 25, the pressure of these arms being maintained by the spring 30. As the pressure in the reservoir and within the bellows 1 falls, the bellows contracts, and in this way draws the stem 5 to the left, pulling the rollers 9 up the inclined surfaces 28 and tensioning the spring 30. The device may be so constructed that the rollers 9 will snap over the points 31 where the oppositely beveled engaging surfaces meet when the pressure falls below the point which is to be maintained. When these rollers 9 are in engagement with the oppositely beveled faces 27 the tension which has been placed upon the spring 30 causes the arms to be brought toward each other and to press inwardly upon the surfaces 27, in this way forcing the switch member 25 to the right, and breaking the connection between the binding posts 21 and the posts 22. After the pressure in the bellows has been restored to the desired point the rollers 9 are returned up the beveled surfaces 27 and snapped over onto the oppositely inclined surfaces 28, which reverses the previously described action and closes the switches.

One important advantage secured by the action of the present mechanism is that the pressure of the switch members 23 and 24, and 33 and 34, against their contacts is maintained, and in fact somewhat increased up to the point of the opening of the switch. This action is secured by the constantly increasing pressure of the rollers 9 against the beveled surfaces which they initially contact, and as these rollers are forced up the beveled surfaces the longitudinal pressure upon the switch rod 5 is increased up to the point where the rollers snap over the point of juncture between the two oppositely inclined and beveled surfaces. Because of this construction there is no chance of arcing between the switch members 23 and 24 and 33 and 34 and the contacts.

The spring 14 is always acting to force the stem 5 to the right and tends to restore the bellows to its normal condition and position as soon as the pressure within the bellows and the reservoir to be controlled have reached the predetermined amount. It is possible by the connection between the switch and the pressure control member to secure an instantaneous breaking of the electrical circuit and an instantaneous movement of the switch members, while preventing any movement at all during the initial movement of the bellows and stem 5. In other words, the initial movement, up to the point at which the break is desired to occur is either absorbed in lost motion as regards any movement of the switch 25, or is absorbed in tensioning the spring 30, while the energy which is thus stored in the spring 30 is released and is made to assist in snapping open the switch as soon as the rollers have passed the point of juncture between the two beveled surfaces on the switch 25.

In Fig. 2 I have shown substantially the same device, but moving in such a way that it operates to open the switch and break the circuit upon an increase in the pressure to a predetermined point. In this construction the bellows 1 is connected by means of the same stem 5 to a cross member 6, which carries the same arms 7 and 8, carrying the rollers 9, which operate against the same oppositely beveled surfaces 27 and 28 on a switch rod 25. The switch members proper 33 and 34, are directed in the opposite direction from those in the preceding figure, however, and the switch is opened by movement of the switch member to the left instead of to the right. A spring 35 is mounted between the bellows 1 and the frame or base 2 and serves to return the bellows to its initial position after the pressure acting upon it has been restored to normal.

In this device, as the pressure is built up in the bellows 1 it moves the stem 5 to the right, thus forcing the rollers 9 upwardly on the inclined surfaces 27 and tensioning the spring 30. As these rollers snap over the point 31 where the two beveled surfaces meet the stored pressure the spring 30 acts to draw the arms 7 and 8 together, and force the switch member 25 to the right, thus breaking the circuits through these switches.

In Fig. 3 I have shown the device of Fig. 2 connected to a pressure system to be controlled thereby. The conduit 13 leads to a reservoir 36, in which a given pressure is to be maintained. This reservoir 36 is provided with a discharge conduit 37 and an inlet or charging conduit 38, the latter extending to a compressor 39, which is driven from a motor 40. The circuit through the motor is carried on the binding posts 21 and 22 on the switch member and the breaking of this circuit through the movement of the switch member disconnects the motor, in this way stopping the compressor, and stopping the further increase of pressure in the reservoir 36. It will be understood that a similar system may be controlled by the device shown in Fig. 1, except that in that event it is the vacuum in the reservoir that is to be maintained at a given point instead of a positive pressure.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention.

1. In an apparatus of the character described, the combination of a support, a pressure or vacuum responsive device carried by said support, a reciprocating member actuated thereby and having spring abutments at each end thereof, a second support, a reversible spring abutment carried by said support and encircling said reciprocating member, a spring surrounding said reciprocating member and interposed between two of said abutments, a second reciprocating member, a reversible switch contact member and a reversible cam block carried by said second reciprocating member, and lost motion means connecting said first reciprocating member with said cam block.

2. In an apparatus of the character described, the combination of a support, a pressure or vacuum responsive device carried by said support, a pair of aligned reciprocating members mounted on said support, lost motion means connecting said members, a spring adapted for reversible association with one of said reciprocating members, a switch contact arm adapted to be reversibly associated with the other of said reciprocating members, and means associated with said lost motion means for abruptly actuating one of said reciprocating members.

Signed by me, this 20th day of July, 1920.

HAL T. PATTON.